United States Patent [19]
Gharavi

[11] Patent Number: 4,969,040
[45] Date of Patent: Nov. 6, 1990

[54] APPARATUS AND METHOD FOR DIFFERENTIAL SUB-BAND CODING OF VIDEO SIGNALS

[75] Inventor: Hamid Gharavi, Red Bank, N.J.

[73] Assignee: Bell Communications Research, Inc., Livingston, N.J.

[21] Appl. No.: 427,744

[22] Filed: Oct. 26, 1989

[51] Int. Cl.$^5$ .............................................. H04N 7/12
[52] U.S. Cl. ..................................... 358/136; 358/135
[58] Field of Search ....................... 358/135, 136, 133; 382/56

[56] References Cited

U.S. PATENT DOCUMENTS

| | | | |
|---|---|---|---|
| 4,663,660 | 5/1987 | Fedele et al. | 358/136 |
| 4,674,125 | 6/1987 | Carlson et al. | 382/49 |
| 4,731,664 | 3/1988 | Nishiwaki et al. | 358/133 |
| 4,805,017 | 2/1989 | Kaneko et al. | 358/136 |
| 4,821,119 | 4/1989 | Gharavi | 358/136 |

OTHER PUBLICATIONS

"Multi-Dimensional Sub-Band Coding: Some Theory and Algorithms," M. Vetterli et al., Signal Processing 6, pp. 97–112, 1984.

"Sub-Band Coding of Images," J. W. Woods et al., IEEE Transactions on Acoustics, Speech, and Signal Processing, vol. ASSP-34, No. 5, pp. 1278–1288, Oct. 1986.

"Sub-Band Coding of Digital Images Using Two-Dimensional Quadrature Mirror Filtering," H. Gharavi et al., Proc. SPIE, vol. 707, pp. 51–61, Sep. 1986.

"Application on Quadrature Mirror Filtering to the Coding of Monochrome and Color Images," H. Gharavi et al., Proc. ICASP '87, vol. 4, pp. 2384–2387, Apr. 1987.

"Sub-Band Coding of Digital Images Using Symmetric Short Kernel Filters and Arithmetic Coding Techniques," D. Le Gall et al., Proc. ICASP 88, vol. 2, pp. 761–764, Apr. 1988.

"Vector Quantization of Color Sub-Band Pictures," H. Gharavi, International Picture Coding Symposium, PCS 87, 8.H., Apr. '87.

"Sub-Band Coding of Monochrome and Color Images", H. Gharavi et al., IEEE Trans. on Circuits and Systems, vol. 35, pp. 207–214, Feb. 1988.

"Transmission on HDTV Signals Under 140 Mbits/s Using a Sub-Band Decomposition and Discrete Cosine Transform Coding," D. Le Gall et al., Proc. National Communications Forum, vol. 42, pp. 1682–1684, Sep. 1988.

"Advances in Picture Coding," H. M. Musmann et al., Proc. IEEE, vol. 73, pp. 523–548, Apr. 1985.

"An Adaptive Strategy for Hybrid Image Coding," A. Habibi, IEEE Trans. Commun., vol. Com-29, pp. 1736–1740, Dec. 1981.

"Progress of CCITT Standardization of nx384 Kbits/s Video Codec," S. Okubo et al., Globecom 87.

"Low Bit-Rate Video Transmission for ISDN Applica- (List continued on next page.)

Primary Examiner—Victor R. Kostak
Attorney, Agent, or Firm—James W. Falk; Stephen M. Gurey

[57] ABSTRACT

A method and apparatus for achieving a high compression of a video signal. The PEL-by-PEL difference between an input signal consisting of digital PEL values of a scanned video signal and a motion compensated interframe prediction signal is decomposed into several narrow bands using separable two-dimensional quadrature mirror filtering (105). Each sub-band is quantized by a symmetric uniform quantizer (106-1–106-4) with a center dead zone. Entropy coders (124-1–124-4) code the quantized values by variable word-length coding the nonzero quantized values and transmitting that information with the corresponding run-length coded positional information. The outputs of the coders are combined by a multiplexer (108), the output of which is input to a buffer (123) which produces a constant rate bit stream. When the occupancy level of the buffer approaches maximum capacity, the dead zones and step sizes of the quantizers are adjusted to force more zero value quantized levels thereby reducing the amount of data being input to the buffer.

32 Claims, 2 Drawing Sheets

OTHER PUBLICATIONS tion", H. Gharavi, IEEE Trans. Circuits and Systems, vol. 35, No. 2, pp. 258-261, Feb. 1988.

"A Filter Family Designed for Use in Quadrature Mirror Filter Banks," J. D. Johnson, Proc. ISCAP, pp. 291-294, 1980.

"Optimum Run Length Codes," H. Meyr et al., IEEE Trans. Commun. vol. Com-22, No. 6, pp. 826-835, Jun. 1974.

"Sub-Band Coding of Images Using Vector Quantization," P. H. Westerink et al., IEEE Trans. on Comm., vol. 96, No. 6, pp. 713-719, Jun. 1988.

APPARATUS AND METHOD FOR DIFFERENTIAL SUB-BAND CODING OF VIDEO SIGNALS

BACKGROUND OF THE INVENTION

This invention relates to coding techniques for the digital transmission of video signals, and more particularly to high compression coding methods and apparatus for the digital transmission of higher quality video signals.

The installation of optical fibers and the trend towards a Broadband Integrated Switched Digital Network (B-ISDN) is expected to encourage the proliferation of higher quality video services such as high definition video conferencing and advanced television (ATV), the latter frequently referred to as high-definition television (HDTV). As a result, ATV transmission and other video services may become a major traffic component on B-ISDN. For efficient utilization of the available bandwidth, ATV transmission at a relatively slow rate of, for example, 45 Mb/s, demands high compression interframe video coding.

Various image compression techniques and their applicability to video signal processing have been studied and reported on in the literature in recent years. For example, there have been extensive reports in the literature relating to sub-band coding for image applications using quadrature mirror filtering QMF. Some of these articles that discuss sub-band coding of images include: "Multi-Dimensional Sub-band Coding; Some Theory and Algorithms," by M. Vetterli, *Signal Processing* 6, (1984), pp. 97-112; "Sub-band Coding of Images," by J. W. Woods and S. D. O'Neil, *Proc. ICASP* 86, pp. 1005-1008, April, 1986; "Sub-band Coding of Digital Images Using Two-Dimensional Quadrature Mirror Filtering," by the inventor herein and A. Tabatabai, *Proc. SPIE*, Vol. 707, pp. 51-61, September, 1986; "Sub-band Coding of Images," by J. W. Woods and S. D. O'Neil, *IEEE Trans. ASSP*, Vol. 34, pp. 1278-1288, October, 1986; "Applications of Quadrature Mirror Filtering to the Coding of Monochrome and Color Images," by the present inventor and A. Tabatabai, *Proc. ICASP* 87, Vol. 4, pp. 2384-2387; "Sub-band Coding of Digital Images using Predictive Vector Quantization," by P. H. Westernik, J. Biemond, and D. E. Boekee, *Proc. ICASP* 87, Vol. 3, pp. 1378-1381; "Sub-band Coding of Digital Images Using Symmetric Short Kernel Filters and Arithmetic Coding Techniques," by D. LeGall and A. Tabatabai, *Proc. ICASP* 88, Vol. 2, pp. 761-764; "Sub-band Coding of Color Images Using Differential Vector Quantization," by the present inventor, *International Picture Coding Symposium*, PCS 87, 8.H; and "Sub-band Coding of Monochrome and Color Images," by the present inventor and A. Tabatabai, *IEEE Trans. on Circuits and Systems*, Vol. 35, pp. 207-214, February, 1988.

As described in the literature, decomposition of the frequency spectrum of an image enables the decomposed bands to be quantized and coded independently of each other. Thus the higher frequency bands, where a large quantization noise would be subjectively less noticeable than in the lower frequency bands, can be quantized with a larger dead zone and with larger step sizes and thus fewer bits than can the lower frequency band with a concomitant overall improvement in coding efficiency.

Most of the aforenoted literature reports on sub-band coding can be classified into two categories: i) the analysis and/or synthesis of QMF filter design and ii) coding. The latter have concentrated on still images applications with very few discussing video applications. Where video applications have been considered, the video signal has been treated, for the sake of simplicity, as a sequence of independent single images as, for example, in "Transmission of HDTV Signals Under 140 Mbits/s Using a Sub-band Decomposition and Discrete Cosine Transform Coding," by D. LeGall, H. Gaggioni, and C. T. Chen, *Proc. National Communications Forum*, Vol. 42, pp. 1682-1684, September, 1988. Whereas these prior art techniques using sub-band decomposition have taken advantage of the intraframe redundancies in coding the video image, they have not eliminated the interframe redundancies.

Since there is a significant amount of redundancies between consecutive frames of video signals, various other coding techniques have been studied for removing these redundancies such as picture replenishment or interframe predictive coding. (See, for example, "Advances in Picture Coding," by H. M. Musmann, P. Pirsh, and H. J. Gravoert, *Proc. IEEE*, Vol. 73, pp. 523-548, April 1985). Many applications of high compression video coding involve the use of hybrid coding which is described in "An Adaptive Strategy for Hybrid Image Coding," by A. Habibi, *IEEE Trans. Commun.*, Vol. COM-29, pp. 1736-1740, December, 1981; and "Progress of CCITT Standardization on $n \times 384$ Kbits/s Video Codec," by S. Okubo, R. Nicol, B. Haskel, S. Sobri, *Globecom*-87.

The hybrid coding method, which is a combination of DPCM and transform coding, is presently considered the most effective coding for video teleconferencing applications. A disadvantage of this method, however, is the subjective degradation in the decoded image whereby the viewers can perceive the outlines of the blocks. This latter problem can be alleviated somewhat by employing a block subdivision technique described by the present inventor in "Low Bit-Rate Video Transmission for ISDN Application," *IEEE Trans. Circuits and Systems*, Vol. 35, pp. 258-261, February, 1988, and which also is the subject of U.S. Pat. No. 4,821,119 issued on Apr. 11, 1989 to the present inventor. Although this latter method improves the block distortion by reducing the block size, block distortion is not totally eliminated.

An object of the present invention is to achieve significantly high video compression by removing both interframe and intraframe redundancies in the digital processing of video signals.

An additional object of the present invention is to eliminate the block distortion that is inherent in prior art hybrid coding techniques.

A further object of the present invention is to entropy encode the video information in as efficient manner as possible and thereby transmit the digital video signal with a desirable high compression ratio.

SUMMARY OF THE INVENTION

The block distortion inherent in any hybrid coding scheme is totally eliminated with the sub-band coding scheme of the present invention. In accordance with the present invention, each frame of the video signal is coded using the previously coded frame for the prediction. In particular, a prediction error for each PEL is derived from the difference between the actual current PEL data and predicted data for that PEL that is based on the PEL data associated with the previous coded frame. The latter may be the coded PEL that is at the exact same spatial location in the previous frame as the current PEL. Alternatively, where motion estimation and compensation are considered, the predicted PEL is based on the PEL in the previous frame as shifted horizontally and vertically in the frame by the components of a derived motion vector. With or without motion compensation, the PEL error signal developed is representative of the frame-to-frame variations due to movement in the video scene. Sub-band coding techniques are then applied to the PEL error signal. Thus, the signal decomposed into plural sub-bands is representative of motion variations. As a result, the frequency spectrum of each of the decomposed bands of the error signal are of a different nature than decomposed bands of an image signal where in the latter it is the black-to-white "edges" of the image that are highlighted. In order to exploit the two-dimensional frame-to-frame movement of an object in the video scene, a two-dimensional rather than a one-dimensional decomposition is effected on the differential PEL error signal. Thus, in the prediction loop, the PEL error signal is split into a plurality of narrow bands using two-dimensional quadrature mirror filtering. The decomposed bands are quantized and coded independently, then multiplexed and transmitted to the receiver. In the predictor feedback loop of the transmitter, the quantized signals, after remapping, are applied to a receiving QMF bank system to reconstruct the PEL error signal which is added to the predicted PEL value from the previous frame to obtain the decoded PEL value in the present frame. This value is exactly the same as the decoded PEL at the receiver side in the absence of channel noise. At the transmitter, the decoded PEL is stored in a frame buffer for future motion compensation prediction.

DETAILED DESCRIPTION

Figure 1:
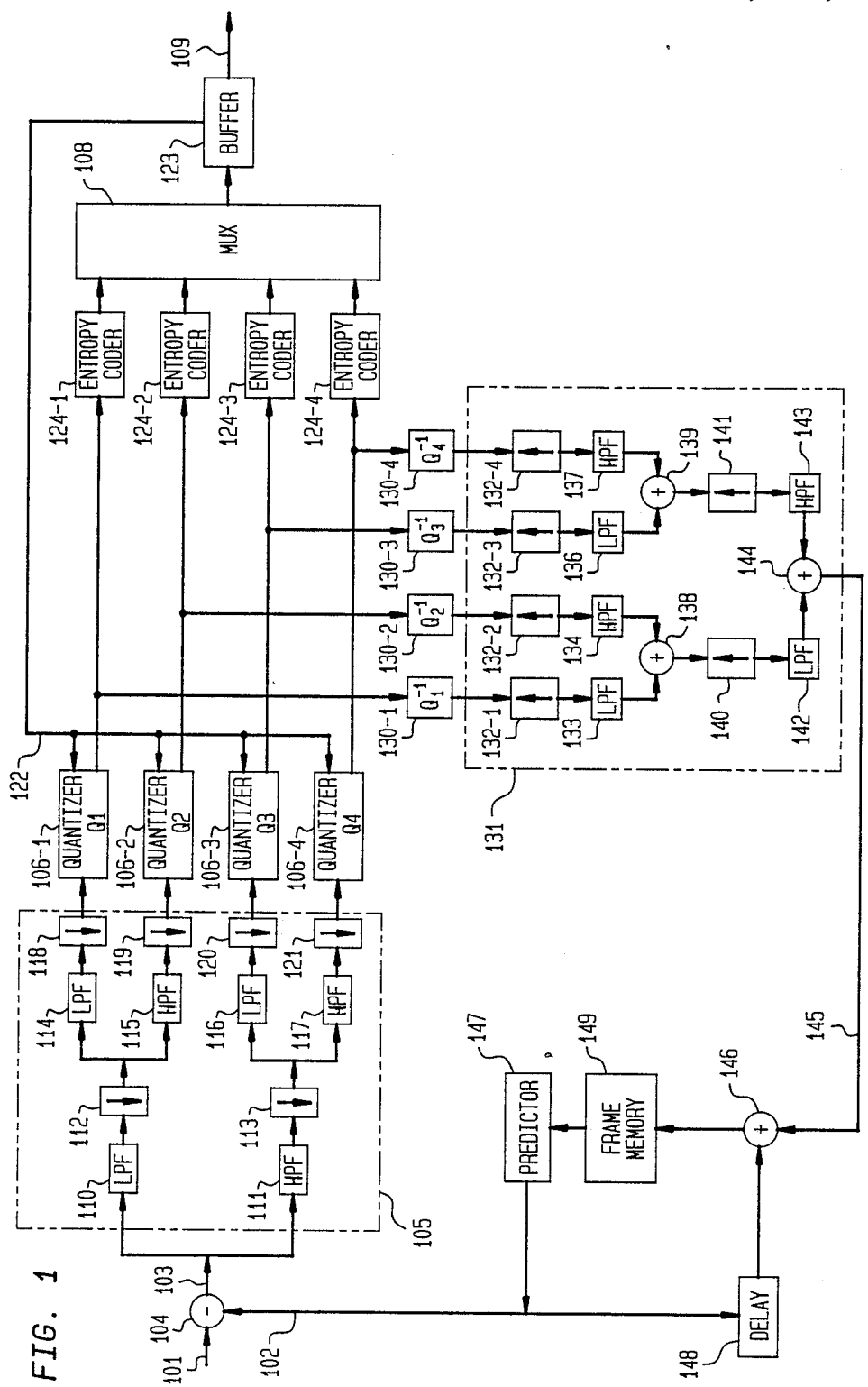
FIG. 1 is block diagram of a differential sub-band coder in accordance with the present invention.

With reference to FIG. 1, the input signal on lead(s) 101 consists of a sequence of coded PEL values representing the intensity of the video signal across and down each scan line of each coded frame. An error signal is developed for each spatial location by comparing the current PEL value on input 101 with a predicted PEL value on lead(s) 102. This predicted PEL value on lead(s) 102 is either the coded PEL at exactly the same spatial location in the previous coded frame, or if motion estimation and compensation is employed, the predicted PEL value on lead(s) 102 is the PEL value in the previous coded frame as displaced horizontally and vertically by the components of a motion vector. The error signal on lead(s) 103 developed by digital subtracter 104 from the difference between the current PEL value on lead(s) 101 with the predicted PEL value on lead(s) 102, is thus a measure of the frame-to-frame movement in the video scene.

The error signal on lead(s) 103, consisting of a sequence of digital differential PEL elements for each current video frame, is processed in the prediction loop using sub-band decomposition. The error signal is split into four narrow bands using a two-dimensional quadrature mirror filter 105. Each of the four narrow band signals are individually quantized by quantizer 106-1–106-4, and then independently coded by entropy coders 124-1–124-4, respectively. A multiplexer 108 multiplexes the outputs of the four coders through a buffer 123 and into a single data stream for transmission onto the data channel 109.

Quadrature mirror filter 105 includes a digital low pass filter (LPF) 110 and a digital high pass filter (HPF) 111, which decompose the frequency spectrum in the horizontal direction into two bands. Filters 110 and 111 can be 16-tap FIR filters designated as type D in "A Filter Family Designed for Use in Quadrature Mirror Filter Banks," by J. D. Johnson, *Proc. ISCAP*-1980, pp. 291–294. Alternatively, these filters can be IIR type digital filters, which are well known in the digital processing art.

The set of filtered digital outputs of filters 110 and 111 has twice the necessary number of samples required for the now half bandwidth. Accordingly, downconverters 112 and 113 discard alternate samples in the horizontal direction at the outputs of filters 110 and 111, respectively.

Figure 2:
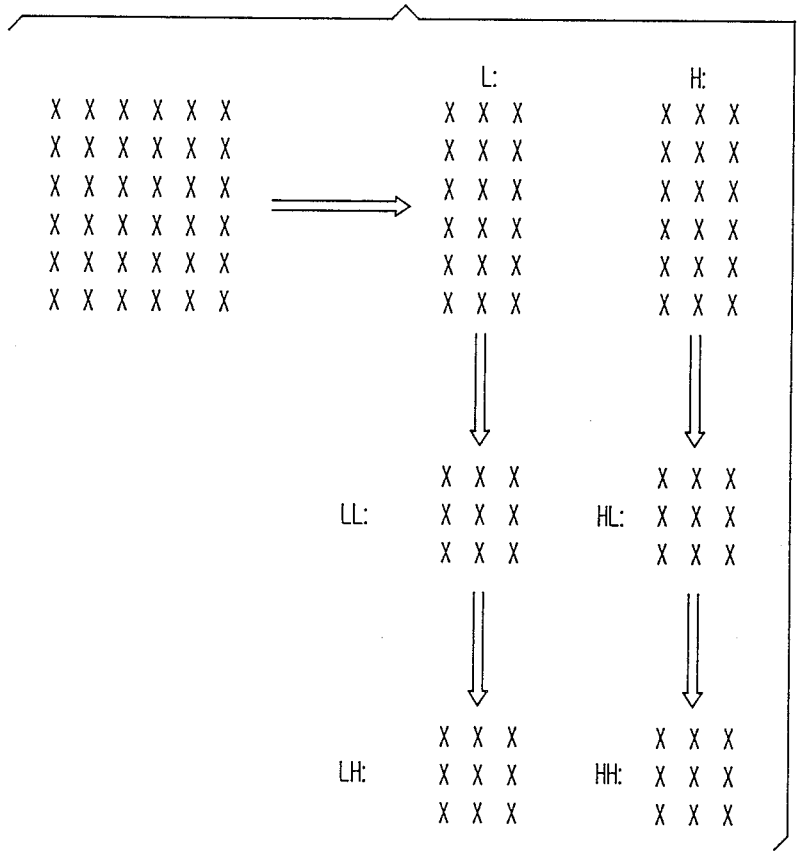
FIG. 2 illustrates the two-dimensional QMF filtering effected on the PEL elements of a digital video image signal.

With reference to FIG. 2, a six PEL by six scan line segment of a video image is shown in which each "x" represents a coded PEL element. This video segment is then shown horizontally decomposed and down-converted into low and high horizontal bands, each comprising three filtered coded elements by six scan lines.

With reference again to FIG. 1, the outputs of downconverters 112 and 113 are further decomposed in the vertical direction into high and low frequency bands. Thus the output of down-converter 112 is connected to digital LPF 116 and digital HPF 115, and the output of down-converter 113 is connected to digital LPF 116 and digital HPF 117. A down-converter 118 discards alternate filtered samples in the vertical direction. Similarly, down-converters 119, 120 and 121 discard alternate filtered samples from the outputs of filters, 115, 116 and 117, respectively.

With reference to FIG. 2, the 3×6 outputs of downconverters 112 and 113 are shown decomposed and down-converted into high and low band 3×3 sections.

With reference again to FIG. 1, the outputs of downconverters 118, 119, 120 and 121 are connected to quantizers 106-1, 106-2, 106-3, and 106-4, respectively. The quantizing schemes $Q_1$, $Q_2$, $Q_3$, and $Q_4$, of these quantizers can be independently designed, as is well known in the art, with a center dead zone, d, and step size, $\Delta$, that is most appropriate to the characteristics of the error signal for the associated frequency band. Thus as aforenoted, in the LL band in which a large quantization noise would be subjectively most objectionable, the quantizer $Q_1$ would be designed to have a smaller dead zone and smaller step sizes than the other bands. In the other bands a larger dead zone will force the low level decomposed error signals to zero, and larger step sizes will require fewer number of levels to be coded and thus fewer bits to be transmitted. As is noted by input lead 122 from a buffer 123 to quantizers 106-1–106-4, values d and $\Delta$ for each quantizer can be controlled by the level of occupancy of the buffer. As will be noted, buffer 123 accepts the multiplexed entropy coded data streams for each of the four bands for transmission onto the data channel 109 at a constant data rate. Accordingly, if the occupancy of the buffer is approaching its maximum capacity, the center dead zone of the quantizers can be increased to force a larger number of decomposed error signals to zero and the step size can be increased to reduce the total number of levels, both thereby reducing the number of bits being inputed by the coder to the multiplexer and to the buffer.

The outputs of quantizers 106-1–106-4 are connected to entropy coders 124-1–124-4, respectively. Each entropy coder is identical and for maximum coding efficiency is a variable word length (VWL) coder to encode the nonzero quantized values and a run-length coder to encode their corresponding locations. This is achieved by considering each scan line of each quantized and decomposed video frame as consecutive black and white runs, the black run corresponding to a zero and the white run to nonzero values. Then only the nonzero quantized values need to be transmitted. The VWL code set may be designed according to the average statistics of all bands so that only one VWL code set is used for all the decomposed bands. With additional complexity, different VWL code sets could be used for the different bands, each code set being tailored to the statistics of the particular band. In the present embodiment, however, coders 124-1–124-4 all use the same code set, as noted.

For each scan line, coders 124-1–124-4 code the runs of zeros and the runs of nonzeros and then the actual VWL codes for the nonzero values. For the run-length coding, a modified version of a B1 code described in "Optimum Run-length Codes," by H. Meyer, H. G. Rosdolsky, and T. S. Huang in *IEEE Trans. Commun.*, Vol./COM-22, June, 1974, pp. 826-835, is employed. This code was selected due to the ease of hardware implementation as the length of codewords increases approximately logarithmically with the run-length. In addition, this code can be used to encode a consecutive black and white sequence regardless of its length. Table I below shows the modified B1 code used in this embodiment of the present invention.

TABLE I

| RUN | CODE |
| --- | --- |
| 1 | C0 |
| 2 | C1 |
| 3 | C0C0 |
| 4 | C0C1 |
| 5 | C1C0 |
| EOL,EOF | C1C1 |
| 6 | C0C0C0 |
| 7 | C0C0C1 |
| 8 | C0C1C0 |
| 9 | C0C1C1 |
| 10 | C1C0C0 |
| 11 | C1C0C1 |
| 12 | C1C1C0 |
| 13 | C1C1C1 |
|  | ETC. |

The first bit, "C", of each block is the color bit indicating whether the run is black (i.e. a "1" indicates a run of zero elements) or white (i.e. a "1" indicates a run of nonzero elements).

Since the sub-bands contain the information which is the result of the mismatches of the moving objects in the consecutive frames, the energy distribution of the frequency spectrum depends on the contrast in brightness between background and moving objects. In many video applications, such as in video conferencing, where the variation in movement is mostly concentrated in the center of the scene, it is beneficial to terminate the run-length coding process for each coding line once the last nonzero value has been reached, and for each video frame, once the last nonzero value has been reached. An End of Line (EOL) and End of Frame (EOF) codeword is thus assigned in the modified B1 code. In this modified B1 code, the codeword C1C1 is the codeword for EOL and EOF, this codeword having been the word assigned to the run of length six in the unmodified B1 code. The codeword for the run of length six is thus assigned to the codeword assigned to the run of seven in the unmodified B1 code, and so forth. The EOL codeword requires another bit to signify the uniqueness of EOL. This additional bit is opposite to the "C" bit chosen for EOL. Thus EOL is selected to be "01011" and EOF the codeword with the opposite "C", "11110". Such EOL and EOF codewords can then be uniquely decoded.

Entropy coders 124-1–124-4 thus code the quantized outputs of quantizers 106-1–106-4, respectively, scan line by scan line for each decomposed differential video frame. For each scan line, the runs of zero and nonzero elements are coded by the code table of Table I. After the run-length of nonzero elements is transmitted, the VWL code words for the actual nonzero elements are transmitted. An EOL code word is transmitted following the last nonzero element on each scan line, and an EOF code word is transmitted following the EOL code word on the last scan line have nonzero elements. The outputs of coders 124-1–124-4 are time-division multiplexed by multiplexer 108 for transmission through buffer 123 onto the data channel 109. As aforenoted, as the occupancy of buffer 123 increases, quantizers 106-1–106-4 are reconfigured so as to reduce the bit outputs of one or all of the coders 124-1–124-4.

At the receiver (not shown), the received data stream is demultiplexed to form four bit streams. The four bit streams are decoded and remapped from the decoded quantized values into values which represent actual levels in the four bands. The four decomposed bands are up-converted, first in the vertical direction, digitally filtered, combined, up-converted, digitally filtered in the horizontal direction, and recombined to recover the digital differential PEL values. The differential PEL values are then added to the actual PEL values from the previous frame to reconstruct the actual PEL values of the current frame.

The functions performed at the receiver are similarly performed in the feedback loop of the coder to reconstruct each actual PEL element in the coded present frame which is then used for differential comparison with the PEL elements in the next video frame. Thus in the feedback loop, inverse quantizers 130-1–130-4 remap the outputs of quantizers 106-1–106-4, respectively, from quantized one-out-of-N filtered error signal sample levels, back to coded values representing the actual quantized filtered error sample levels. These quantized sample outputs of inverse quantizers 130-1–130-4 are input to a reconstruction filter bank 131 which in this embodiment is a receiving quadrature mirror filter. In this receiving quadrature mirror filter 131, the decomposed filtered samples are again digitally filtered in the vertical and horizontal direction and recombined to reconstruct the original error signal for each PEL element in the video frame.

In receiving quadrature mirror filter 131 the outputs of inverse quantizers 130-1–130-4 are input to up-converters 132-1–132-4, respectively. Up-converters 132-1–132-4 increase the number of samples in the vertical direction by placing a zero value sample after each actual sample. A low pass digital filter 133, identical to low pass filter 114 in the forward loop, filters each of the up-converted samples in this first band while a high pass digital filter, 134 identical to high pass filter 115, filters each of the upconverted samples in the second band. Corresponding filtered samples at the outputs of filters 133 and 134 are summed by digital adder 138 to produce low band signal samples comparable to the low band filtered samples at the output of down-converter 112 in the forward loop. Similarly, in the third band, the samples at the output of up-converter 132-3 are filtered by a low pass digital filter 136 which is identical to low pass filter 116. In the forth band, the samples at the output of up-converter 132-3 are filtered by a high pass digital filter 137 which is identical to high pass filter 117. The filtered samples at the outputs of filters 136 and 137 are summed by digital adder 139 to produce samples which are comparable to the samples at the output of down-converter 113 in the forward loop.

An up-converter 140 up-converts the samples at the output of adder 138 by placing, in the horizontal direction, a zero value sample after each summed sample. Up-converter 141 similarly up-converts the samples at the output of adder 139. The up-conversion in the vertical and the horizontal directions thus dimensionally restores the number of samples in the horizontal and vertical directions at the outputs of up-converters 140 and 141 to the dimensions of the differential video image on lead(s) 103 at the output of subtracter 104.

Each of the digital samples at the output of up-converter 140 is filtered by digital low pass filter 142 which is identical to filter 110 in the forward loop and each of the samples at the output of up-converter 141 is filtered by digital high pass filter 143 which is identical to filter 111. Spatially corresponding filtered samples at the output of filters 142 and 143 are summed by digital adder 144 to produce differential PEL samples on lead 145 which correspond one-by-one to the differential PEL samples on lead 103 but differ therefrom by the quantizing noise introduced by quantizers 106-1–106-4 plus the nearperfect filter reconstruction noise introduced by filters 133, 134, 136, 137, 142 and 143.

In order to reconstruct the actual PEL values of the current frame for comparison with the incoming PELs in the next video frame, each of the differential PEL samples on lead 145 is added by adder 146 to the PEL value being fed to subtracter 104 on lead 102. Accordingly, this same predicted PEL value output by a predictor 147 is fed through a delay circuit 148 back to adder 146 to form the actual PEL value for processing of the next successive frame. Delay circuit 148 is required to compensate for the delay created by the multitap structural implementations of the decomposition digital filters and the reconstruction digital filters. The output of digital adder 146 is input to a frame memory 149 which stores the reconstructed PEL elements for processing of the next video frame. In processing each PEL in the next video frame, predictor 147 selects a PEL from frame memory 149 that is the predictor of the PEL element then present on lead 101. As aforenoted, this predictor can be the coded PEL on exactly the same spatial location in the frame as the PEL on lead 101. When motion compensation is incorporated into predictor 147, the predicted PEL will be shifted horizontally and vertically by the components of the motion vector from the spatial location of the PEL on lead 101. Either of the two well known in the art approaches for motion compensated prediction can be employed by predictor 147: PEL recursive and block matching motion estimation. In PEL recursive motion estimation the motion parameters are recursively estimated to minimize the motion compensated error signal at each PEL. The important feature of this approach is that it does not generate a blocking effect. In addition, the rotary and translatory motion, which is the nature of the real world scene, can be dealt with. In block matching motion estimation the coding frame is portioned into blocks of PEL data by assuming that all the PELs within each nonoverlapping block have the same displacement vector. The motion vector corresponding to each block is estimated by searching through a larger block, centered at the same location on the previous coding frame, for the best match.

In the above-described embodiment of the present invention, the PEL error signals formed on lead(s) 103 from the difference between the PEL samples on lead(s) 101 and the predicted PELs on lead(s) 102 are shown decomposed in two-dimensions into four distinct bands. Any or all of these bands can be further decomposed horizontally and vertically. For example, the low-low band itself can further decomposed into four bands for a total of seven decomposed bands. Each of the seven bands is then quantized with an individual nonuniform quantizer.

Such a seven-band decomposition has been experimentally found to be useful in the coding of color video signals. In such a coding system the primary color components R, G, and B are transformed to luminance and two color difference signals $C_r$ and $C_b$, where $C_r$ and $C_b$ are weighted values of $R-Y$ and $B-Y$, respectively. The color components and the luminance signal are then decomposed and coded as described above. No motion estimation, however, is performed on the color difference frames, with the color components being motion compensated using the motion vectors derived for the luminance signals. The higher bands can be coded with a much lower accuracy. For a seven band nonuniform decomposition, the higher band color component signals can be totally discarded without any significant perceptual difference. In the DPCM/QMF feedback loop the discarded higher bands are generated by inserting zero valued PELs before arriving at receiving QMF banks. The interpolated color difference signals are added to the prediction value to obtain the decoded signal.

In the coding and transmission of HDTV signals, conventional present day storage capabilities are insufficient for the very large number of picture elements associated with each video frame. Both the storage and computational complexity required for such a system makes prediction based on stored PEL elements from a previous frame extremely difficult. Accordingly, a one-dimensional sub-band decomposition only in the horizontal direction can be performed on the difference signal between the input signal and the prediction signal. The vertical correlation between PELs can then be exploited with a line predictor in the feedback loop that uses information from the previous video line to form the prediction signal fed back to the input.

In the above-described embodiments of the present invention sub-band decomposition has been accomplished by means of quadrature mirror filtering. Other methods of decomposing the bands, such as pyramid coding, could have been employed to achieve advantageous high compression results.

The above-described embodiments are illustrative of the principles of the present invention. Other embodiments could be devised by those skilled in the art without departing from the spirit and scope of the present invention.

What is claimed is:

1. A high compression coder for coding video signals comprising:
   means for receiving an input signal consisting of digital PEL values of a scanned video signal, said video signal consisting of sequential video frames and each video frame consisting of a plural scan lines, said input signal having a predetermined number of PEL values per video frame,
   means for forming differential PEL values from digital differences between the PEL values in said input signal and digital predicted PEL values that are associated with PELs in said input signal and that are each derived from at least one previous PEL value in the input signal,
   means using quadrature-mirror filter means for decomposing said differential PEL values into plural narrow band sub-band sequences of filtered differential PEL values,
   means for discarding in each sub-band sequence of filtered differential PEL values alternate ones of the filtered values to form plural down-converted sub-band sequences of differential PEL values, the total number of down-converted differential PEL values in all of said plural down-converted sub-band sequences of filtered differential PEL values that correspond to each video frame being exactly equal to said predetermined number of PEL values per video frame,
   means for separately quantizing the down-converted differential PEL values in each of the plural down-converted sub-band sequences,
   means for entropy coding each of the quantized plural down-converted sub-band sequences of filtered differential PEL values,
   means for multiplexing into a single multiplexed bit stream all of said entropy coded quantized plural down-converted sub-band sequences of filtered differential PEL values,
   means for reconstructing said differential PEL values from said separately quantized plural down-converted sub-band sequences of filtered differential PEL values,
   storage means for storing reconstructed PEL values,
   means for combining said reconstructed differential PEL values with stored previously reconstructed PEL values to form newly reconstructed PEL values and for storing said newly reconstructed PEL values in said storage means, and
   means for forming said predicted PEL values from stored previously reconstructed PEL values,
   wherein frame-by-frame said multiplexed bit stream has substantially fewer bits than said input signal.

2. A high compression coder in accordance with claim 1 wherein said quadrature mirror filter means is a two-dimensional quadrature mirror filter.

3. A high compression coder in accordance with claim 1 wherein said means for separately quantizing comprises plural quantizers having individual quantizing schemes.

4. A high compression coder in accordance with claim 3 wherein said means for entropy coding comprises means for variable-length coding each nonzero value and means for run-length coding the location of the nonzero values in down-converted sub-band sequences of filtered differential PEL values that are associated with each scan line.

5. A high compression coder in accordance with claim 4 wherein said means for run-length coding the location of the nonzero values comprises means for coding the runs of zeros and the runs of nonzero values.

6. A high compression coder in accordance with claim 5 wherein said means for entropy coding further comprises means for producing a unique end-of-line code word following the last nonzero value in each scan line and a unique end-of-frame code word following the last nonzero value in each video frame.

7. A high compression coder in accordance with claim 3 further comprising buffer means for receiving said multiplexed bit stream and producing an output bit stream having a constant bit rate.

8. A high compression coder in accordance with claim 7 further comprising means for adjusting the quantizing schemes of said plural quantizers in accordance with the occupancy level of said buffer means.

9. A high compression coder for coding video signals comprising:
   means for receiving an input signal consisting of digital PEL values of a scanned video signal, said video signal consisting of sequential video frames and each video frame consisting of plural scan lines, said input signal having a predetermined number of PEL values per video frame,
   means for forming differential PEL values from digital differences between the PEL values in said input signal and digital predicted PEL values that are associated with PELs in said input signal and that are each derived from PEL values in a previous video frame,
   means using quadrature-mirror filter means for decomposing said differential PEL values into plural narrow band sub-band sequences of filtered differential PEL values,
   means for discarding in each sub-band sequence of filtered differential PEL values alternate ones of the filtered values to form plural down-converted sub-band sequences of differential PEL values, the total number of down-converted differential PEL values in all of said plural down-converted sub-band sequences of filtered differential PEL values that correspond to each video frame being exactly equal to said predetermined number of PEL values per video frame,
   means for separately quantizing the down-converted differential PEL values in each of the plural down-converted sub-band sequences,
   means for entropy coding each of the quantized plural down-converted sub-band sequences of filtered differential PEL values,
   means for multiplexing into a single multiplexed bit stream all of said entropy coded quantized plural down-converted sub-band sequences of filtered differential PEL values,
   means for reconstructing said differential PEL values from said separately quantized plural down-converted sub-band sequences of filtered differential PEL values,
   storage means for storing reconstructed PEL values,
   means for combining said reconstructed differential PEL values with stored previously reconstructed PEL values from the previous frame to form newly reconstructed PEL values and for storing said newly reconstructed PEL values in said storage means, and means for forming said predicted PEL values from stored reconstructed PEL values from the previous frame, wherein frame-by-frame said multiplexed bit stream has substantially fewer bits than said input signal.

10. A high compression coder in accordance with claim 9 wherein said quadrature mirror filter means is a two-dimensional quadrature mirror filter.

11. A high compression coder in accordance with claim 10 wherein said digital predicted PEL values are the reconstructed PEL values stored in said storage means in the corresponding spatial locations in the previous frame.

12. A high compression coder in accordance with claim 10 wherein said means for forming said predicted PEL values comprises means for estimating horizontal and vertical components of the translatory motion of corresponding PELs from one frame to the next, and said predicted PEL values are the reconstructed PEL values stored on said storage means in the corresponding spatial locations in the previous frame as shifted horizontally and vertically by the estimated motion of the PELs.

13. A high compression coder in accordance with claim 9 wherein said means for separately quantizing comprises plural quantizers having individual quantizing schemes.

14. A high compression coder in accordance with claim 4 wherein said means for entropy coding comprises means for variable-length coding each nonzero value and means for run-length coding the location of the nonzero values in down-converted sub-band sequences of filtered differential PEL values that are associated with each scan line.

15. A high compression coder in accordance with claim 14 wherein said means for run-length coding the location of the nonzero values comprises means for coding the runs of zeros and the runs of nonzero values.

16. A high compression coder in accordance with claim 15 wherein said means for entropy coding further comprises means for producing a unique end-of-line code word following the last nonzero value in each scan line and a unique end-of-frame code word following the last nonzero value in each video frame.

17. A high compression coder in accordance with claim 13 further comprising buffer means for receiving said multiplexed bit stream and producing an output bit stream having a constant bit rate.

18. A high compression coder in accordance with claim 17 further comprising means for adjusting the quantizing schemes of said plural quantizers in accordance with the occupancy level of said buffer means.

19. A method for compressing an input bit stream containing the digital PEL values of a scanned video signal, said video signal consisting of sequential video frames and each video frame consisting of plural scan lines, said input signal having a predetermined number of PEL values per video frame, comprising the steps of:

forming differential PEL values from digital differences between the PEL values in the input bit stream and digital predicted PEL values that are associated with PELs in the input bit stream and that are each derived from at least one previous PEL value in the input bit stream, decomposing using a quadrature-mirror filter the differential PEL values into plural narrow band sub-band sequences of filtered differential PEL values, discarding in each sub-band sequence of filtered differential PEL values alternate ones of the filtered values to form plural down-converted sub-band sequences of differential PEL values, the total number of down-converted differential PEL values in all of said plural down-converted sub-band sequences that correspond to each video frame being exactly equal to said predetermined number of PEL values per video frame, quantizing separately each of the plural down-converted sub-band sequences of differential PEL values, entropy coding each of the quantized plural down-converted sub-band sequences of filtered differential PEL values, and multiplexing into a single multiplexed bit stream all of the entropy coded quantized plural down-converted sub-band sequences of filtered differential PEL values.

20. The method of claim 19 wherein the step of entropy coding comprises the steps of:

variable-length coding in each scan line of quantized filtered values each nonzero values and run-length coding in each scan line of quantized filtered values the location of the nonzero values.

21. The method of claim 20 wherein the step of run-length coding comprises the step of run-length coding the runs of zeros and the runs of nonzero values.

22. The method of claim 21 further comprising the steps of:

producing a unique end-of-line code word following the last nonzero value in each scan line, and producing a unique end-of-frame code word following the last nonzero value in the video frame.

23. The method for compressing an input bit stream containing the digital PEL values of a scanned video signal of claim 19 further comprising the step of:

storing the multiplexed bit stream in a buffer which produces an output at a constant bit rate.

24. The method of claim 23 further comprising the step of:

adjusting the quantizing of the plural narrow band digital signals in accordance with the occupancy level of the buffer.

25. A high compression video coder comprising means for receiving an input signal consisting of PEL values of a scanned video signal, said video signal consisting of sequential video frames and each video frame consisting of plural scan lines, said input signal having a predetermined number of PEL values per video frame, means for forming differential PEL values from differences between the PEL values in the input signal and predicted PEL values that are associated with PELs in the input signal and that are each derived from at least one previous PEL value in the input signal, means using quadrature-mirror filter means for decomposing said differential PEL values into plural narrow band sub-band sequences of filtered differential PEL values, means for discarding in each sub-band sequence of filtered differential PEL values alternate ones of the filtered values to form plural down-converted sub-band sequences of differential PEL values, the total number of down-converted differential PEL values in all of said plural down-converted sub-band sequences that correspond to each video frame being exactly equal to said predetermined number of PEL values per video frame, means for separately quantizing the down-converted differential PEL values in each of the plural down-converted sub-band sequences, means for entropy coding each of the quantized plural down-converted sub-band sequences of filtered differential PEL values, and means for multiplexing into a single multiplexed bit stream all of said entropy coded quantized plural down-converted sub-band sequences of filtered differential PEL values.

26. A high compression video coder in accordance with claim 25 wherein said quadrature mirror filter means is a two-dimensional quadrature mirror filter.

27. A high compression video coder in accordance with claim 26 wherein said means for separately quantizing comprises plural quantizers having individual quantizing schemes.

28. A high compression coder in accordance with claim 27 wherein said means for entropy coding comprises means for variable-length coding each nonzero value and means for run-length coding the location of the nonzero values in down-converted sub-band sequences of filtered differential PEL values that are associated with each scan line.

29. A high compression coder in accordance with claim 28 wherein said means for run-length coding the location of the nonzero values comprises means for coding the runs of zeros and the runs of nonzero values.

30. A high compression coder in accordance with claim 29 wherein said means for entropy coding further comprises means for producing a unique end-of-line code word following the last nonzero value in each scan line and a unique end-of-frame code word following the last nonzero value in each video frame.

31. A high compression video coder in accordance with claim 27 further comprising buffer means for receiving said multiplexed bit stream and producing an output bit stream at a constant bit rate.

32. A high compression video coder in accordance with claim 31 further comprising means for adjusting the quantizing schemes of said plural quantizers in accordance with the occupancy level of said buffer means.

* * * * *

UNITED STATES PATENT AND TRADEMARK OFFICE
CERTIFICATE OF CORRECTION

PATENT NO. : 4,969,040

DATED : November 6, 1990

INVENTOR(S) : Hamid Gharavi

It is certified that error appears in the above-identified patent and that said Letters Patent is hereby corrected as shown below:

Title page, Abstract, line 2, "signal." should read --signal are disclosed--.

Column 4, line 34, "116" should read --114--.

Column 5, line 55, "1" should read --0--.

Signed and Sealed this

Second Day of February, 1993

Attest:

STEPHEN G. KUNIN

Attesting Officer      Acting Commissioner of Patents and Trademarks